United States Patent [19]

Miyatani et al.

[11] Patent Number: 4,548,617

[45] Date of Patent: Oct. 22, 1985

[54] ABRASIVE AND METHOD FOR MANUFACTURING THE SAME

[75] Inventors: Takashi Miyatani; Junji Nakata, both of Yokohama; Kisuke Seki, Tokyo; Takafumi Kageyama, Osaka, all of Japan

[73] Assignees: Tokyo Shibaura Denki Kabushiki Kaisha; Mitsui Toatsu Chemicals, Inc., both of Japan

[21] Appl. No.: 522,736

[22] Filed: Aug. 12, 1983

[30] Foreign Application Priority Data

Aug. 20, 1982 [JP] Japan .................. 57-144455
Dec. 28, 1982 [JP] Japan .................. 57-229230
Dec. 28, 1982 [JP] Japan .................. 57-229231

[51] Int. Cl.$^4$ .............................. B24D 11/00
[52] U.S. Cl. ........................ 51/293; 51/295; 51/298; 252/174.21; 264/118
[58] Field of Search .............. 51/293, 295, 298; 252/174.21; 264/118, 341

[56] References Cited

U.S. PATENT DOCUMENTS

| | | | |
|---|---|---|---|
| 3,313,067 | 4/1967 | Smith et al. | 51/298 |
| 3,661,544 | 5/1972 | Whitaker | 51/295 |
| 4,189,395 | 2/1980 | Bland | 51/298 |
| 4,251,408 | 2/1981 | Hesse et al. | 51/298 |

*Primary Examiner*—Paul Lieberman
*Assistant Examiner*—Willie Thompson
*Attorney, Agent, or Firm*—Cushman, Darby & Cushman

[57] ABSTRACT

An abrasive for removing flashes of a molded product, which comprises synthetic resin particles, each particle having a plurality of cutting edges and of cracks capable of easily forming cleavages upon collision against a workpiece. A method for manufacturing such synthetic resin abrasive particles which comprises a step of intentionally forming a number of cracks in the resin particles.

30 Claims, 11 Drawing Figures

F I G. 6
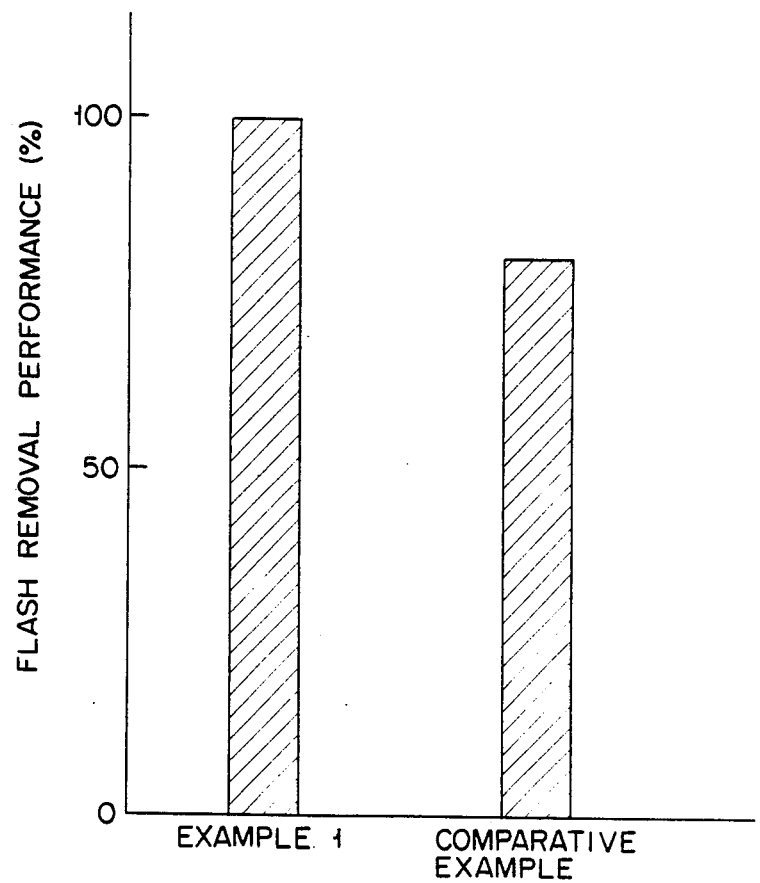

ABRASIVE AND METHOD FOR MANUFACTURING THE SAME

BACKGROUND OF THE INVENTION

I. Field of the Invention

The present invention relates to an abrasive and, more particularly, to an abrasive suitable for removing flashes from synthetic resin molded products.

II. Description of the Prior Art

Molded products obtained through a plastic encapsulation step of semiconductor devices such as ICs or LSIs often have flashes. For example, a semiconductor molded product 11 as shown in FIG. 3 is obtained in the following manner. A lead frame 9 on which a semiconductor element (not shown) is mounted is placed in a mold and an epoxy resin is injected into the mold. Thus, a resin layer 10 encapsulates the semiconductor element on the lead frame 9. When such a molded product is obtained, resin flashes 12 tend to be formed on that portion of the lead frame 9 which is sealed by the resin layer 10 and between the leads of the lead frame 9. Thus, a step for removing such flashes is required as a post-molding step.

In order to remove the flashes 12 from the lead frame 9, a hard abrasive such as alumina, silicon carbide, or glass bead, or a soft abrasive such as a walnut shell flour is blasted onto the flashes at a high speed.

However, a problem is encountered when a hard abrasive is used. That is, such a hard abrasive has a hardness $H_RC$ of 70 or more while the cured epoxy resin which is usually employed for a semiconductor package has a hardness $H_RM$ of about 100. Thus, the abrasive is far harder than the epoxy resin and has a specific gravity which is four times that of the epoxy resin. For this reason, when the flashes 12 are removed, the surface of the molded product 11 is damaged to have a poor outer appearance. In addition to this, moisture may be introduced through the damaged portions of the molded product 11, adversely affecting reliability of the semiconductor element.

On the other hand, a problem is also encountered when a soft abrasive such as a walnut shell flour or an apricot shell flour is used. Such a soft abrasive has a large elasticity and viscosity in a dry state. Accordingly, the edges of the abrasive particles become rounded within a short period of time, and the abrasion efficiency is lowered accordingly. Furthermore, since the abrasive force of a soft abrasive is weaker than that of a hard abrasive, it will take a longer processing period of time. To shorten the processing period of time, a soft abrasive must be blasted at a higher pressure than a hard abrasive. This leads to deformation of the lead frame 9 and a higher running cost of the manufacturing equipment of the molded products. Since a soft abrasive generally is of dielectric material, when a soft abrasive is used, static electricity is generated between the abrasive and the molded product 11 upon contact therebetween. The static electricity firmly attaches the fine powder of the abrasive to the surface of the molded product 11. As a result, an outer appearance of the product 11 is degraded, leaving incomplete soldered or plated portions in a subsequent soldering or plating step. This leads to a problem of corrosion of the lead frame 9.

SUMMARY OF THE INVENTION

It is an object of the present invention to provide an abrasive which is capable of removing, with greater efficiency, flashes which are formed during manufacture of a synthetic resin molded product such as a plastic encapsulated semiconductor package, without damaging the molded product and without generating static electricity.

It is another object of the present invention to provide an abrasive and a method for manufacturing such an abrasive which is capable of exhibiting an excellent performance over a long period of time.

According to an aspect of the present invention, there is provided an abrasive which comprises synthetic resin particles each of which has a plurality of cutting edges and has cracks that can easily form cleavages upon collision against a workpiece.

According to another aspect of the present invention, there is also provided a method for manufacturing a synthetic resin abrasive by molding a synthetic resin mass and grinding the mass, wherein, in the molding and/or grinding step(s), cracks are formed in the abrasive particles such that these cracks may easily form cleavages upon collision against a workpiece.

In synthetic resin particles of an abrasive of the present invention, a number of cracks are irregularly formed. When such an abrasive is made to collide against a workpiece (e.g., by spraying), the particles become separated at the cracks so as to form new cutting edges (self blade-forming function). Therefore, new sharp edges of the abrasive constantly act on the flashes of a molded product, so that flash removal may be performed with high efficiency and the durability of the abrasive can be prolonged.

In this specification, the term "cracks which can easily form cleavages upon collision against a workpiece" means, as will be apparent from the following description, cracks which are formed by intentionally producing internal strain in synthetic resin particles or formed by physical, thermal or chemical means, in large number in synthetic resin particles in the molding and/or grinding step(s) of the synthetic resin. Accordingly, the "cracks" must be differentiated from a few minute cracks which can be formed by simply crushing a synthetic resin molded product with a crusher or the like. This is because the minute cracks cannot sufficiently supply new cutting edges to compensate worn cutting edges upon collision against a workpiece, and are inefficient to keep a desired level of performance.

A synthetic resin to be used herein preferably has a relatively large hardness and a small ductility. Examples of such a synthetic resin may include cured thermosetting resins of such as an epoxy resin, a urea resin, an unsaturated polyester resin, or a melamine resin; and thermoplastic resins such as polystyrene, polycarbonate or polyacrylate. Since a thermosetting resin is hard and can form particles with sharper edges, it is more suitable for flash removal.

When an abrasive is to be used for flash removal from plastic encapsulated semiconductor packages, a resin which has a hardness equal or close to that of the resin encapsulating the device is optimal. For example, for a product encapsulated with an epoxy resin having a hardness $H_RM$ of about 100, an unsaturated polyester resin or an alkyd resin having a hardness $H_RM$ of 80 to 120 is optimal. The size of particles of such a synthetic resin can be arbitrarily selected in accordance with each application. However, when an abrasive is used for removing flashes from a molded product, the abrasive preferably consists of particles having both an average particle size and peak in particle size distribution falling within the range of 0.05 to 2.0 mm (the avarage particle size being defined as half the sum of the maximum diameter and the minimum diameter).

The shape of the particles of the resin may be arbitrarily selected from spherical, needle-like, flat, polygonal and so on. Also, a mixture of particles having different shapes may also be used. An abrasive consisting of particles having different shapes generally has a better performance than an abrasive consisting of particles of a single shape.

The particles of the resin abrasive preferably have a large number of cutting edges to grind a workpiece or remove flashes therefrom upon being blasted against the workpiece in a wet or dry blasting method.

Thus, the average size and shape of particles of an abrasive of the present invention can be determined depending upon various features of a workpiece to be worked upon, precision required for this specific workpiece, and so on.

A synthetic resin abrasive of the present invention may contain a surfactant on the surfaces of or within the particles. When such a surfactant is contained in the abrasive and such an abrasive is employed in a wet blasting process, upon formation of cracks in the resin flashes, water can easily flow into the gaps between the flashes and the lead frames and the like. The surfactant also serves to prevent electrical charging of the lead frame or the like upon collision with the abrasive particles. The surfactant may be of cationic, anionic, non-ionic, or ampholytic. However, when an abrasive is to be used for removing flashes from a plastic encapsulated semiconductor package, it is preferable to use a non-ionic surfactant which does not contain metal ions, halogens, ammonia, phosphorus, sulfur or the like which may adversely affect the semiconductor element. Examples of a non-ionic surfactant may include a polyoxyethylene alkyl ether, a polyoxyethylene alkyl ester, a polyoxyethylene alkyl phenol ether, a sorbitan alkyl ester, and a polyoxyethylene sorbitan alkyl ester. The amount of such a surfactant to be contained in the synthetic resin abrasive of the present invention is not determined by the type of surfactant used or method of application of the abrasive. However, a surfactant can be added, in general, in the amount of 0.001 to 1% by weight. When a surfactant is mixed in the particles of a synthetic resin abrasive, it is mixed to a degree such that the surfactant suitably smears out from the surface of the particles.

According to the present invention, cracks can be formed in particles of an abrasive by the following method in the molding and/or grinding step(s) of a synthetic resin.

WHEN THERMOSETTING RESIN IS USED AS SYNTHETIC RESIN MASS (A) Internal strain is produced during molding:

(i) A powder (having a particle size of 0.01 to 2 mm) of a thermosetting resin is dispersed in a synthetic resin mass as nuclei, and cracks are formed around the nuclei due to their shrinkage during molding.

(ii) A synthetic resin mass is gelled by heating or by addition of a catalyst. During curing, external stress is applied to the resin to granulate the resin, thereby forming an infinite number of cracks due to brittleness of the molded product, prior to complete curing.

(iii) A synthetic resin mass is cured at a temperature higher than a general curing temperature. Internal strain is produced due to rapid curing so as to form an infinite number of cracks.

(B) After molding a synthetic resin mass, it is submerged in a suitable solvent such as acetone or methanol or in boiling water so as to form cracks in the molded product.

(C) After a molded synthetic resin mass is pressed by a press instrument having a number of blades to granulate the molded product, it is milled, thereby forming cracks.

(D) After a synthetic resin mass is molded and granulated, it is cooled to a temperature of −10° C. or lower and preferably −20° C. or lower. The molded product, which is rendered brittle in this manner, is then milled.

(E) After a synthetic resin mass is molded and granulated, it is heated to a high temperature (e.g., 150° C. or higher). The molded product is then milled and cracks are formed.

(F) A thermal impact is applied to a molded product of a synthetic resin mass by rapid heating or cooling so as to form cracks.

(G) Cracks are formed by combining more than one of items (A) to (F) above.

WHEN THERMOPLASTIC RESIN IS USED AS SYNTHETIC RESIN MASS

Cracks are formed by one of or a combination of more than one of items (A)(i), (B), (C), (D) and (F).

Synthetic resin mass to be employed in this invention may be milled into a desired particle size using a granulator, a rotary crusher, a disc grinder, a cone grinder, a hammer mill, an edge runner eccentric mill, a tube mill, a ball mill, a roll mill or the like.

An abrasive of the present invention consists of synthetic resin particles having cracks which can form cleavages upon application of an external force. Thus, when the abrasive of the present invention is subjected to a blasting finishing by a wet or dry blasting method, the workpiece can be ground or flashes can be removed therefrom. At the same time, cleavages are easily formed along the cracks of the particles of the abrasive due to the impact of collision with the workpiece. Thus, new sharp cutting edges are constantly formed in the particles of the abrasive, and the abrasive can provide an excellent performance over a long period of time.

The use of an abrasive of the present invention is not limited to removal of flashes from a plastic encapsulated semiconductor package but may be extended to removal of flashes from other types of molded products, surface treatment of soft metal products and so on.

BRIEF DESCRIPTION OF THE DRAWINGS

FIG. 6 is a graph showing flash removal performance according to an Example of the present invention and a Comparative Example;

DETAILED DESCRIPTION OF THE PREFERRED EMBODIMENTS

The present invention will now be described by way of examples, wherein all percentages and parts are based on weight except otherwise indicated.

EXAMPLE 1

Figure 1:
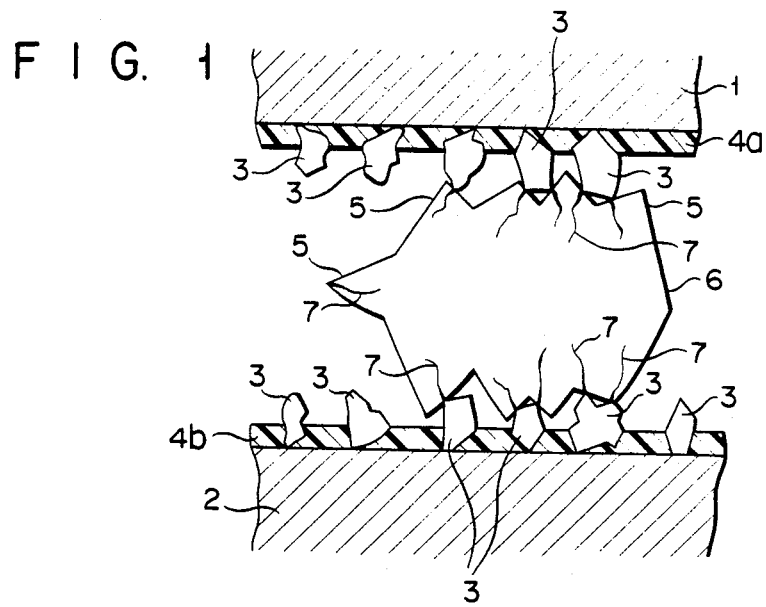
FIG. 1 is a sectional view showing the principle of formation of cracks in synthetic resin particles according to an embodiment of the present invention.

A crosslinking agent "MEKPO" (55% methyl ethyl ketone peroxide) was added in an amount of 2% to an unsaturated polyester resin, "Estar R 235 A-1" (Trade name of Mitsui Toatsu Chemicals, Inc.). The resultant mixture was injected into a mold having dimensions of 300×300×20 (mm) to provide a cured polyester resin block. The block was cut into pieces and then granulated using a crusher. Thereafter, the granules were milled by an impact grinder to provide polyester resin particles having an average size of about 0.7 mm and a number of sharp blade-like edges. Subsequently, a compressor as shown in FIG. 1 was prepared. Pieces 3 made of a material far harder than the synthetic resin (e.g., a diamond) were held through fixing layers 4a and 4b on the opposing surfaces of upper and lower molds 1 and 2. Polyester resin particles 6 having a number of edges 5 prepared by the above-mentioned method were placed between the upper and lower molds 1 and 2. When the upper and lower molds 1 and 2 were compressed, the particles 6 in contact with the pieces 3 were milled, to provide as shown in FIG. 2 an abrasive 8 consisting of particles having an average size of about 0.3 mm and a number of cracks 8a capable of easily forming cleavages upon application of an external force.

Figure 2:
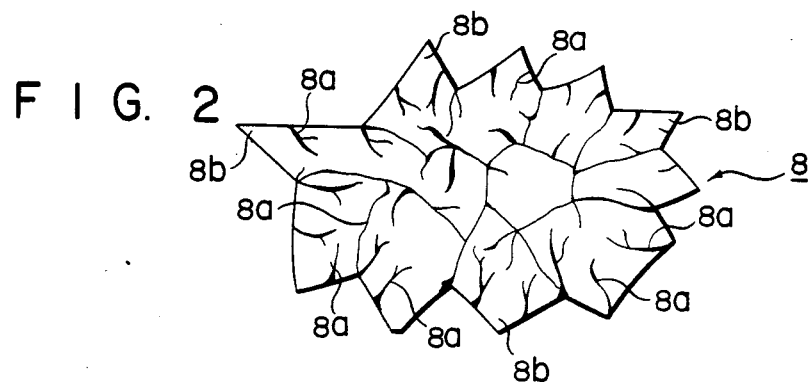
FIG. 2 is a plan view showing a shape of abrasive particles and cracks according to the present invention.

The abrasive 8 as shown in FIG. 2 had many cracks 8a and cutting edges 8b of various sizes.

Figure 3:
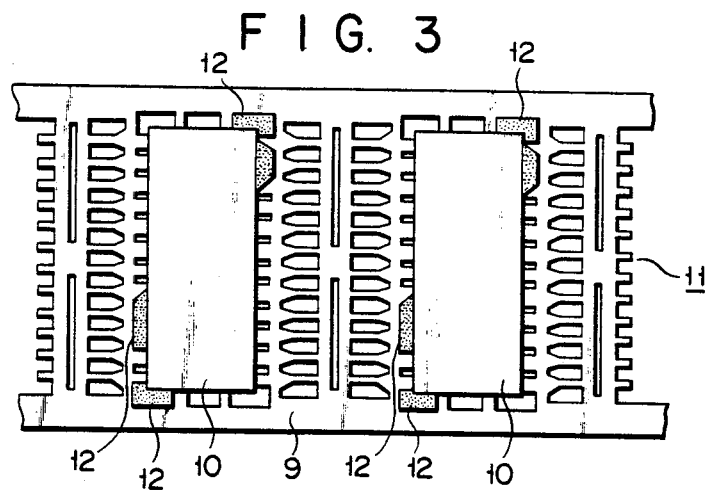
FIG. 3 is a plan view of a plastic encapsulated semiconductor package having flashes.
Figure 4:
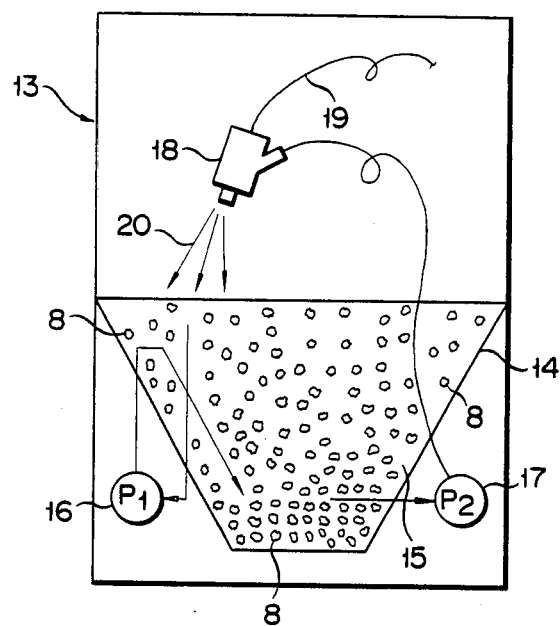
FIG. 4 is a schematic representation of a wet-type blast apparatus used for removing flashes from plastic encapsulated semiconductor packages.

Flash removal from a plastic encapsulated semiconductor package by the abrasive 8 as shown in FIG. 3 will now be described with reference to a case wherein a wet-type blast apparatus as shown in FIG. 4 is used.

After placing a lead frame 9 mounting a semiconductor element thereon in a mold, an epoxy resin was injected into the mold. Thus, a plastic encapsulated semiconductor package 11 as shown in FIG. 3 was obtained wherein semiconductor elements (not shown) on the lead frame 9 were encapsulated within a resin layer 10. In the package 11, flashes 12 were formed on that portion of the lead frame 9 which was on the resin layer 10 and between the gaps of the leads of the lead frame 9.

A hopper 14 of a compressor chamber 13 of the apparatus shown in FIG. 4 was charged with the abrasive 8 and water 15 in the ratio of 1:3. A first pump 16 was activated to draw by suction the abrasive 8 together with the water 15, and to forcibly supply them toward the bottom of the hopper 14. Thus, a slurry was obtained in which the abrasive 8 was uniformly dispersed.

Figure 5:
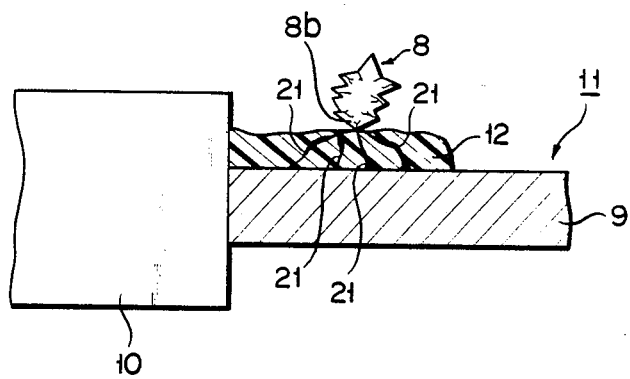
FIG. 5 is a sectional view showing the principle of removal of a flash by an abrasive of the present invention.

A second pump 17 was then activated to draw the slurry into a gun 18. The gun 18 accelerated the slurry by compressed air from an air duct 19, and blasted a three-phase high-speed jet flow 20 of water, the abrasive and air toward a plastic encapsulated semiconductor package (not shown) conveyed in the compressor chamber 13. When the flow is blasted against the package, the abrasive 8 consisting of particles having a number of edges 8b collides against the flashes 12 formed on the lead frame portion of the package 11 and between the leads of the lead frame 9, as shown in FIG. 5. The flashes 12 consist of a thermosetting epoxy resin, and cracks 21 are formed therein by the concentrated (local) impact and the associated vibration by the edges 8b of the relatively brittle abrasive 8. Water ingresses into the cracks 21 formed in the flashes 12 and between the lead frame 9 and the flashes 12 to float the flashes 12 away from the lead frame 9. Since the abrasive 8 having edges 8b is repeatedly collided against the cracks 21 of the flashes 12, the flashes 12 can be completely removed partially because of the floating force of the flashes 12.

As has been described above, since the abrasive 8 has irregular cracks 8a running from the surfaces of the particles toward their interiors, the particles form cleavages along the cracks 8a upon collision against the package 11. Thus, the rounded edges are removed, and new sharp edges are formed. As a result, the abrasive 8 can maintain a satisfactory performance for removal of the flashes 12 from the package 11 even after a long period of usage.

When the package 11 is sprayed with a flow of the abrasive 8 and so on, the flashes 12 of the package 11 can be effectively removed. Furthermore, even flashes 12 which are formed at narrow sites (e.g., between the leads of the lead frame 9) can be completely removed by sharp edges formed by splitting of cleavages along the cracks 8a of the abrasive 8.

The excellent flash removing performance of the abrasive 8 of the present invention was confirmed by a Test to be described below. The Test includes a Comparative Example.

Comparative Example

The "MEKPO" was added in the amount of 2% to an unsaturated polyester raw material "Estar R 235 A-1". The resultant mixture was injected into a mold having dimensions of 300×300×20 (mm). A synthetic resin block thus obtained was granulated by a crusher, and the granules were then milled by an impact grinder to provide a synthetic resin abrasive having an average size of about 0.3 mm.

Flash removal from plastic encapsulated semiconductor packages was performed using the abrasive having cracks as obtained in Example 1 and the abrasive of the Comparative Example. The results obtained are shown in a graph in FIG. 6. The test conditions were as follows. After 24 hours of continuous flash removal from plastic encapsulated semiconductor packages, the abrasive was used for flash removal from a further 10,000 packages. One thousand packages were randomly sampled for each of Example 1 and the Comparative Example. The ratio of the number of packages from which the flashes were completely removed to the total number of sampled packages for Example 1 and the Comparative Example is shown in the form of a bar graph in FIG. 6. As may be seen from FIG. 6, the abrasive of Example 1 provides substantially 100% flash removal efficiency while that of the Comparative Example shows a flash removal efficiency of only about 80%. Thus, the abrasive of the present invention was proved to have an excellent performance.

The use of the abrasive of the present invention is not limited to flash removal from plastic encapsulated semiconductor packages alone but may be extended to flash removal from other resin molded products, surface treatment of soft metals and the like.

EXAMPLE 2

The "MEKPO" was added in the amount of 2% to the "Estar R 235 A-1", and the resultant mixture was injected into a mold having dimensions of 300×300×200 (mm) to provide a thick synthetic resin block in order to utilize heat of reaction, although it is a general practice to make a mold as thin as below 5 mm in thickness in order to accelerate the removal of heat of reaction from the interior of a mold. The block was raised to a temperature of 250° C. or higher at the center of the interior thereof, and an infinite number of cracks were formed due to the internal strain. The block with the cracks formed therein was granulated by a crusher, and the granules were then milled using an impact grinder. An abrasive consisting of particles having an average size of about 0.3 mm and with a number of cracks was obtained. The abrasive of Example 2 also provides as excellent a flash removal efficiency as that of Example 1.

EXAMPLE 3

Twenty parts of the abrasive having a size of 1 mm or less obtained in Example 2 were mixed as nuclei with 100 parts of the "Estar R 235 A-1". Two parts of the "MEKPO" were added to the resultant mixture, and the obtained mixture was injected into a mold having dimensions of 300×300×200 (mm) to provide a cured synthetic resin block. The block was subjected to thermal impact by heating or the like to form an infinite number of cracks. Thus, an abrasive having a number of cracks of about 0.3 mm size was obtained following the same procedure as for Example 2. The abrasive of Example 3 also provides as excellent a flash removal performance as that of Example 1.

EXAMPLE 4

The "MEKPO" was added in the amount of 0.3% to the "Estar R 235 A-1". The resultant mixture was injected into a mold having the same dimensions as those in Example 1, and was reacted at a temperature of about 5° C. for gelation. An impact stress was immediately applied to the block to form cracks therein. The sufficiently cured block was subjected to the same procedure as in Example 2 to provide an abrasive having an average size of about 0.3 mm and a number of cracks. The abrasive of Example 3 also provides as excellent a flash removal performance as that of Example 1.

EXAMPLE 5

When molding as in Example 4 was performed, the temperature of the synthetic resin mixture was kept at 100° to 150° C. to produce internal strain and to form cracks thereby. Following the same procedures as in Example 2, an abrasive having an average size of about 0.3 mm and a number of cracks was obtained. The abrasive of Example 5 also had as excellent a flash removal performance as that of Example 1.

EXAMPLE 6

A block which was cured using the same resins, under the same catalytic conditions and in a mold of the same dimensions as those used for Example 1 was heated to 150° to 200° C. and was then rapidly cooled to −10° C. or lower. Alternatively, the block may be rapidly heated from a temperature of −10° C. or lower to a temperature of 100° to 200° C. Cracks were thus formed in the block. Thereafter, an abrasive having an average size of about 0.3 mm and a number of cracks was obtained following the same procedures as for Example 2. The abrasive of Example 6 also had as excellent a flash removal performance as that of Example 1.

EXAMPLE 7

A block cured using the same resins, under the same catalytic conditions and in a mold of the same dimensions as those used for Example 1 was granulated by the same method as that used in Example 2. The synthetic resin granules were kept immersed in a chemical such as an acetone solution or a methanol solution. After draining the chemical, the granules were milled to provide an abrasive having an average size of about 0.3 mm and a number of cracks. The abrasive of Example 7 also had as excellent a flash removal performance as that of Example 1.

EXAMPLE 8

A block cured using the same resins, under the same conditions and in a mold of the same dimensions as those used for Example 1 was granulated by the same method as that used in Example 2. The synthetic resin granules were cooled to −20° C. and were milled by the same method as that used in Example 2 to provide an abrasive having an average size of about 0.3 mm and a number of cracks. The abrasive of Example 8 also had as excellent a flash removal performance as that of Example 1.

EXAMPLE 9

Synthetic resin granules obtained by the same method as used for Example 2 were heated to 170° C. and were milled under the same temperature. An abrasive was obtained which had an average size of about 0.3 mm and a number of cracks. The abrasive of Example 9 also had as excellent a flash removal performance as that of Example 1.

EXAMPLE 10

Polyoxyethylene nonyl ether (non-ionic surfactant) was added in an amount of 0.1% to an unsaturated polyester resin solution. The mixture was stirred and uniformly mixed. A curing agent "MEKPO" was added in the amount of 2% as in Example 1, and the mixture was injected into a mold having dimensions of 300×300×200 (mm) to obtain a cured material having a hardness of $H_RM$ 100.

After the cured product was crushed by a crusher, particles of intermediate size were obtained using an impact grinder. The particles were classified to obtain synthetic resin particles having a hardness $H_RM$ of 100 and an average size of 0.7 mm.

Using the same compressor as that described with reference to Example 1, the granules were milled to provide an abrasive having an average particle size of about 0.3 mm, and a number of cracks capable of easily forming cleavages.

Subsequently, the abrasive of Example 10 and the abrasive of Example 1, which latter did not contain a surfactant, were subjected to a flash removal test on 10000 test pieces under the same conditions (spray pressure, flow rate, spray time) and using the same apparatus as used for Example 1. The time required to completely remove the flashes from each of the 10000 test pieces was examined for each of the abrasives. As a result, the abrasive containing the surfactant displayed an improved processing time 20% better than that of the abrasive which did not contain any surfactant.

When a surfactant was used, due to the cleaning effect of the surfactant, flashes or pieces of flashes tend not to become attached to the test pieces or jigs for flash removal, and can be easily removed in a later step. When a dry blasting method was employed, it was confirmed that the electric charge of the test piece could be prevented.

In the abrasive of Example 10, the surfactant is attached on the surfaces and within the particles. Accordingly, even if the abrasive is stored for a long period of time in the form of a slurry, the surfactant is gradually dissolved in water to maintain the surfactant concentration in the jet flow constant. For this reason, replenishment of the surfactant is not required, and flash removal can be stably performed. It should also be noted that the presence of many cracks make the surfactant easily exude from the particles.

EXAMPLE 11

The abrasive containing a number of cracks obtained in Example 3 was immersed several times in an about 1% aqueous solution of sorbitan alkyl ester. The abrasive was then dried and was coated with a surfactant. The obtained abrasive and the abrasive of Example 3 were subjected to the same test as described for Example 10. Substantially the same results as those obtained for Example 10 were obtained.

EXAMPLE 12

The granules with a number of cracks obtained in Example 2 were milled using a granulator, a rotary crusher, a disc grinder, a cone grinder, a hammer mill, an edge runner eccentric mill, or the like. The molded product of the synthetic resin can be made thin or thick or stranded prior to milling to allow easy milling into particles having flat, block and needle-like shapes. Then, an abrasive having an average particle size of about 1 mm and containing uniform amounts of flat, block and needle-like shapes is obtained.

Figure 7A:
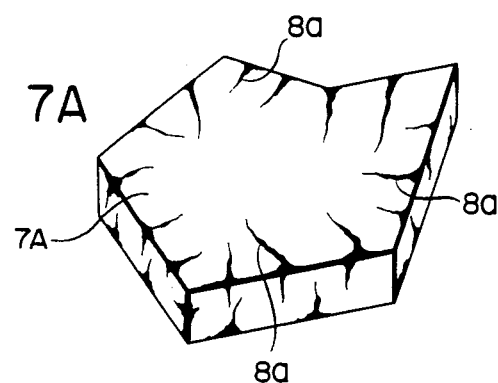
FIGS. 7A, 7B and 7C respectively show a various shapes of synthetic resin particles.
Figure 7B:
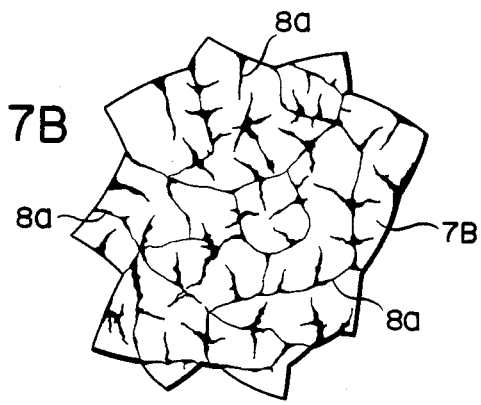
Figure 7C:
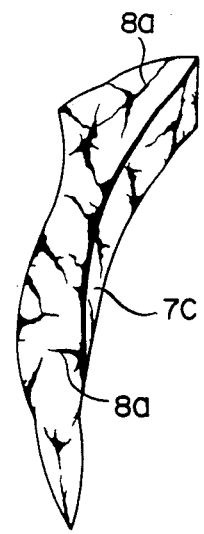

For the purpose of comparison, as shown in FIGS. 7A, 7B and 7C abrasives each having cracks 8a and consisting of flat-, block- or needle-shaped particles 28A, 28B and 28C alone were prepared.

Figure 8:
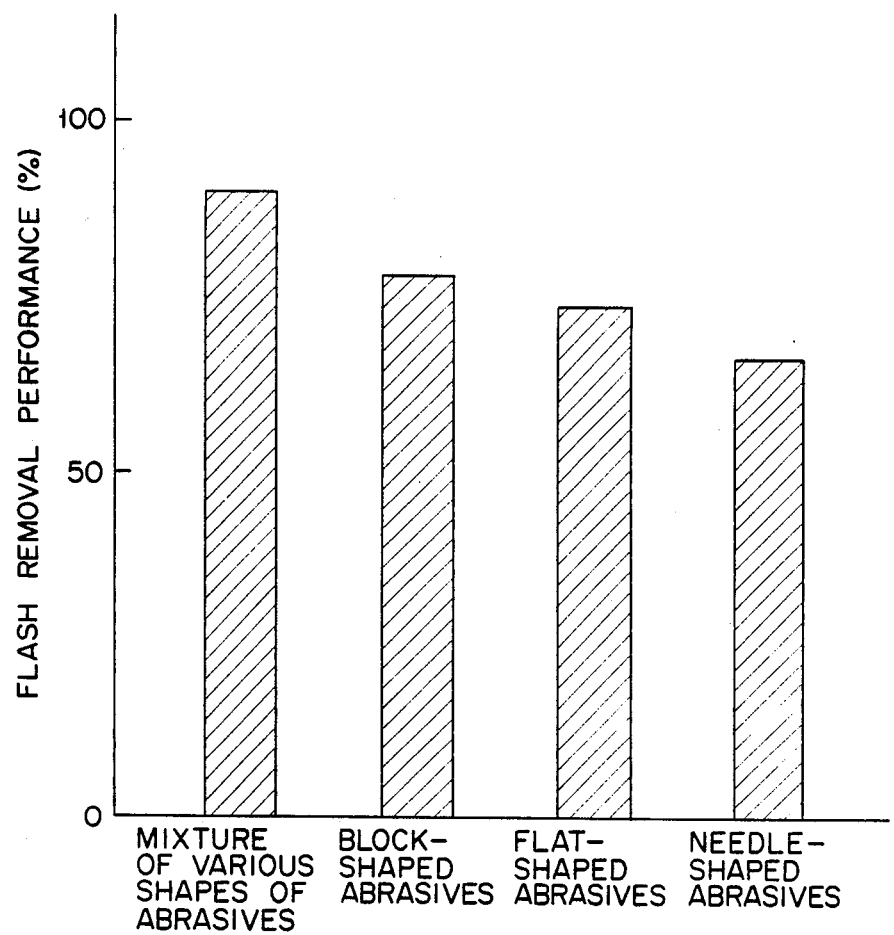
FIG. 8 shows a graph showing flash removal performances of a various shapes of an abrasive of the present invention.

The abrasives of these four types were used for flash removal following the same procedures as for Example 1. The results are shown in FIG. 8. The test conditions were as follows. After 12 hours of continuous flash removal from plastic encapsulated semiconductor packages, the abrasive was used for flash removal from a further 10,000 packages. One thousand packages were randomly sampled for each type of samples. The ratio of the number of packages from which the flashes were completely removed to the total number of sampled packages is shown in percentage. The quality of performance from best to worst, in order, was given by the mixture, the block-shaped particles alone, the flat-shaped particles alone, and the needle-shaped particles alone.

EXAMPLE 13

Cracked particles were obtained following the same procedures as used in Example 1 except that polystyrene, polyacrylate and hard polyvinyl chloride were used in place of the cured polyester resin block. The obtained abrasive was used for flash removal from plastic encapsulated semiconductor packages as in Example 1. The abrasive of Example 13 showed substantially the same performance as that of Example 1.

For the purpose of comparison, an abrasive consisting of particles having a spherical or cylindrical shape and consisting of a thermoplastic resin having substantially no cracks and having an average size of 0.2 to 1.6 mm was also used for flash removal as in Example 1.

Figure 9:
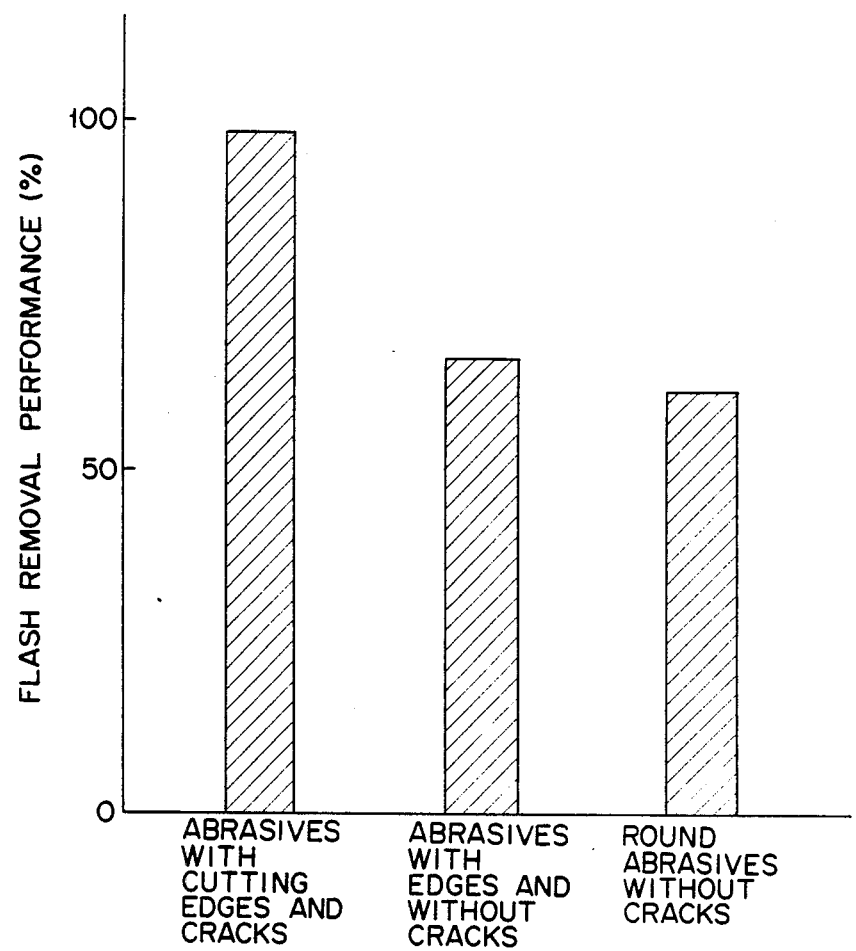
FIG. 9 is a graph showing flash removal performance according to an Example of the present invention and a Comparative Example.

The results are shown in FIG. 9. The flash removal performance are determined by conducting the same sampling method as in Example 1 and indicated by percentage.

What is claimed is:

1. An abrasive comprising synthetic resin particles, each said resin particle having (a) a plurality of cutting edges and (b) a plurality of cracks capable of easily forming cleavages upon collision against a workpiece.

2. An abrasive according to claim 1, wherein the synthetic resin particles contain a surfactant.

3. An abrasive according to claim 2, wherein the surfactant is on the surface and within the particles.

4. An abrasive according to claim 2, wherein the synthetic resin particles have a surfactant attached only on surfaces thereof.

5. An abrasive according to claim 2, wherein the surfactant is a non-ionic surfactant.

6. An abrasive according to claim 5, wherein the non-ionic surfactant does not contain a halogen, ammonia, phosphorus, sulfur and metal ions.

7. An abrasive according to claim 1, wherein the synthetic resin particles contain not more than 1% by weight of a surfactant.

8. An abrasive according to claim 7, wherein the surfactant is a non-ionic surfactant.

9. An abrasive according to claim 8, wherein the non-ionic surfactant does not contain a halogen, ammonia, phosphorus, sulfur and metal ions.

10. An abrasive according to claim 1, wherein the synthetic resin particles consist of a cured themosetting resin.

11. An abrasive according to claim 10, wherein the thermosetting resin is one member selected from the group consisting of a urea resin, a melamine resin, an unsaturated polyester resin, an alkyd resin and an epoxy resin.

12. An abrasive according to claim 1, wherein the synthetic resin particles have at least one shape selected from the group consisting of a flat shape, a needle-like shape, and a block shape.

13. An abrasive according to claim 1, wherein the synthetic resin particles have both an average particle size and a peak of the particle size distribution falling within the range of 0.05 to 2.0 mm, the particle size being defined as ½ of a sum of a maximum diameter and a minimum diameter thereof.

14. A method for manufacturing a synthetic resin abrasive by steps of molding a synthetic resin mass and grinding the molded synthetic resin mass, and wherein at least one of said steps of molding and grinding is practiced by the step of forming cracks which can easily form cleavages upon collision against a workpiece.

15. A method according to claim 14, wherein said step of forming cracks is practiced by producing internal strain in the molding step.

16. A method according to claim 15, wherein particles of a thermosetting resin are dispersed as nuclei in the synthetic resin mass and the internal strain is produced in the molding step.

17. A method according to claim 15, wherein the synthetic resin mass is gelled by one of heating and addition of a catalyst, and internal strain is produced during curing.

18. A method according to claim 15, wherein the synthetic resin mass is cured at a temperature higher than a curing temperature thereof so as to produce internal strain due to rapid curing.

19. A method according to claim 15, wherein after the synthetic resin mass is molded, the molded product is immersed in one of a solvent and boiling water, and is then ground.

20. A method according to claim 14, wherein after the synthetic resin mass is molded and granulated, the mass is milled by pressing with an instrument having a number of blades.

21. A method according to claim 14, wherein after the synthetic resin mass is molded and granulated, the mass is milled at a temperature of not higher than 10° C.

22. A method according to claim 14, wherein after the synthetic resin mass is molded and granulated, the mass is kept at an elevated temperature to be rendered brittle, and is then milled.

23. A method according to claim 14, wherein the synthetic resin mass is subjected to a thermal impact by one of rapid heating and rapid cooling, and is then ground.

24. A method according to claim 14, wherein the synthetic resin mass contains a surfactant prior to molding.

25. A method according to claim 14, wherein the synthetic resin raw material is ground and surfaces of particles are coated with a surfactant.

26. A method according to claim 25, wherein coating of the surfaces of the particles is performed by dipping the particles in a surfactant solution.

27. A method according to claim 25, wherein coating of the particles with the surfactant is performed after forming the cracks in the particles.

28. A synthetic resin particle for abrading a workpiece, said particle including plural cutting edges and plural cracks, wherein said cracks form cleavages in said particle upon collision of said particle with a workpiece.

29. A synthetic resin particle for abrading a workpiece, said particle comprising (a) cutting edge means defining plural cutting edges, and (b) means defining plural cracks, said crack-defining means for forming cleavages in said particle in response to collision of said particle against the workpiece.

30. A method for manufacturing a synthetic resin abrasive comprising the steps of:
(a) forming a discrete plurality of resin particles, each particle having a plurality of cutting edges; and
(b) forming a plurality of cracks in each said particle such that said cracks are capable of forming cleavages upon collision of said particles with a workpiece.

* * * * *